US009015178B2

(12) United States Patent
Greenspan et al.

(10) Patent No.: US 9,015,178 B2
(45) Date of Patent: Apr. 21, 2015

(54) MANAGEMENT OF PACKAGE DELIVERY

(75) Inventors: Steven L. Greenspan, Scotch Plains, NJ (US); Stefan Ionescu, Stony Brook, NY (US); John Kane, Tafton, PA (US)

(73) Assignee: CA, Inc., New York, NY (US)

( * ) Notice: Subject to any disclaimer, the term of this patent is extended or adjusted under 35 U.S.C. 154(b) by 179 days.

(21) Appl. No.: 13/617,079

(22) Filed: Sep. 14, 2012

(65) Prior Publication Data

US 2014/0081951 A1 Mar. 20, 2014

(51) Int. Cl.
*G06F 7/00* (2006.01)
*H04L 29/06* (2006.01)
*H04W 12/08* (2009.01)

(52) U.S. Cl.
CPC .............. *H04W 12/08* (2013.01); *H04L 63/102* (2013.01)

(58) Field of Classification Search
CPC ............ G06F 21/6227; G06F 21/6254; G06F 17/30864; G06F 17/30; G06F 21/6245; G06F 21/62; G06F 2221/2141
USPC .......................................................... 707/752
See application file for complete search history.

(56) References Cited

U.S. PATENT DOCUMENTS

| 7,664,486 | B2 | 2/2010 | Noguchi |
| 7,751,629 | B2 | 7/2010 | Cheong et al. |
| 8,069,169 | B2 | 11/2011 | Fitzpatrick et al. |
| 2002/0013739 | A1* | 1/2002 | O'Donnell et al. ............. 705/26 |
| 2008/0052244 | A1 | 2/2008 | Tsuei et al. |
| 2008/0147564 | A1 | 6/2008 | Singhal |
| 2010/0063897 | A1 | 3/2010 | Sonderegger et al. |
| 2011/0258078 | A1 | 10/2011 | Sonderegger et al. |
| 2011/0264524 | A1 | 10/2011 | Ewers et al. |

* cited by examiner

*Primary Examiner* — Truong Vo
(74) *Attorney, Agent, or Firm* — Myers Bigel Sibley & Sajovec, P.A.

(57) ABSTRACT

Apparatuses, Methods and programs are provided. A method may comprise receiving a first request to verify an identifier associated with a destination from a first requester, responding to the request with a response, the response indicating an existence of a physical address associated with the identifier, the response further comprising a list of authorized entities authorized to access information specifying the physical address, receiving a second request from a second requester to access information specifying the physical address associated with the identifier, determining if the second requester is authorized to have access to information specifying the physical address by analyzing the list of authorized entities corresponding to the identifier; and providing the physical address to the second requester if the second requester is authorized.

24 Claims, 10 Drawing Sheets

Figure 3
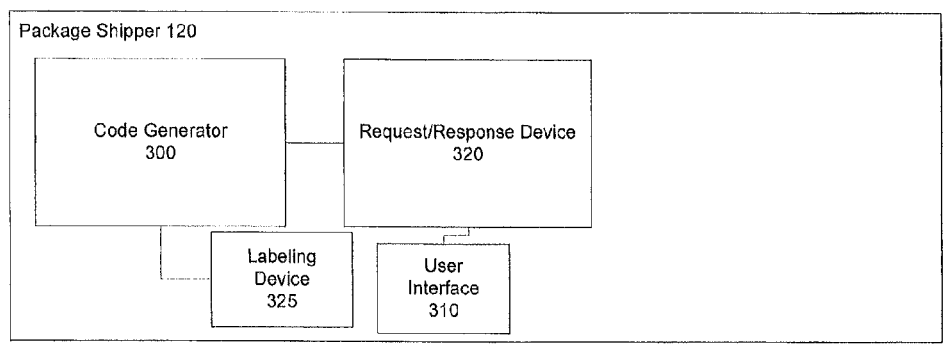
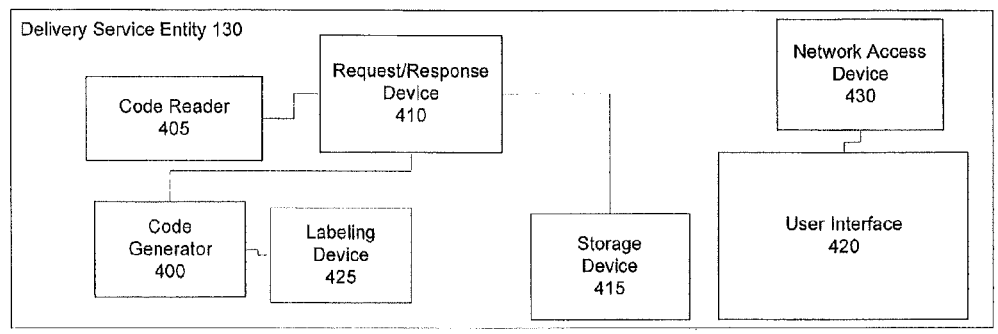
Figure 4

Figure 12
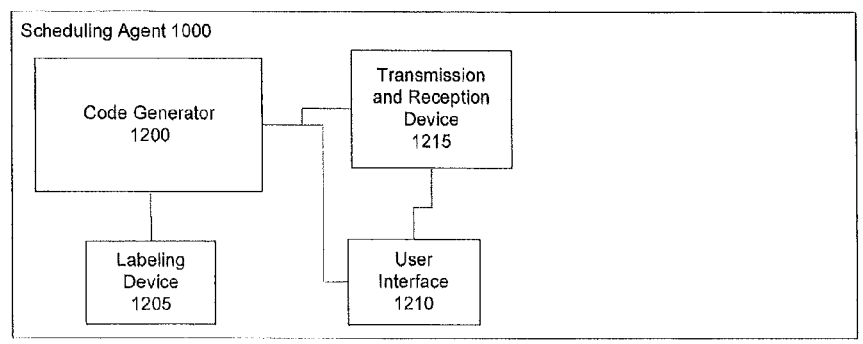
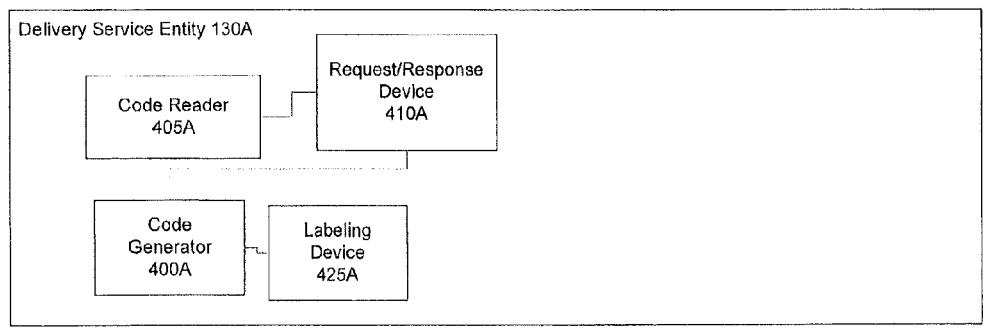
Figure 13

MANAGEMENT OF PACKAGE DELIVERY

BACKGROUND

This disclosure relates to package delivery.

A physical postal address is typically used for describing the location of a physical asset such as a commercial or residential building. Using text, it describes physical references such as street names, city and zip (or postal) codes. Within a package delivery system, the address includes the name of the recipient and identifies a start (sender's address) and end point (the recipient) for package delivery. Thus, most packages sent through the system include a return address, a destination and a postal stamp.

BRIEF SUMMARY

Disclosed is a method comprising receiving a first request to verify an identifier associated with a destination from a first requester; responding to the first request with a response, the response indicating an existence of a physical address associated with the identifier, the response further comprising a list of authorized entities authorized to access information specifying the physical address, receiving a second request from a second requester to access information specifying the physical address associated with the identifier, determining if the second requester is authorized to have access to the information specifying the physical address; and providing the physical address to the requester if the second requester is authorized.

Also disclosed is a method comprising associating an identifier with a container, creating a relationship between the identifier and a plurality of addresses corresponding to a plurality of recipients defining a sequential delivery order, receiving a request for an address associated with the identifier, selecting an address from the plurality of addresses based upon the sequential delivery order; and providing the selected address to the requester.

Also disclosed is a computer program product. The computer program product comprises a computer readable storage medium having computer readable program code embodied therewith. The computer readable program code comprises computer readable program code configured to respond to a first request to verify an identifier associated with a destination from a first requester, the response indicating an existence of a physical address associated with the identifier, the response further comprising a list of authorized entities authorized to access information specifying the physical address, to receive a second request to access information specifying the physical address associated with the identifier from a second requester, to determine if the second requester is authorized to have access information specifying the physical address by analyzing the list of authorized entities corresponding to the identifier and to provide the physical address to the requester if the second requester is authorized.

Also disclosed is a computer program product. The computer program product comprises a computer readable storage medium having computer readable program code embodied therewith. The computer readable program code comprises computer readable program code configured to associate an identifier with a container, to store in a storage device a relationship between the identifier and a plurality of addresses corresponding to a plurality of recipients defining a sequential delivery order, to receive a request for an address associated with the identifier, to select an address from the plurality of addresses based upon the sequential delivery order and to provide the selected address to the requester.

Also disclosed is an apparatus comprising a storage unit configured to store a plurality of destination data records, each of the plurality of destination data records being indexed by an identifier, a communications unit configured to receive a request for information and transmit a response to the request, an authentication unit configured to identify a source of the request; and a request processing unit configured to determine the response to the request based upon the identity of the source. The response is determined to comprise either a confirmation of an existence of a destination data record along with a list of authorized entities authorized to access information specifying a physical address from the destination data record, where the request comprises an identifier of the destination data record, and information comprising the information specifying the physical address from the destination data record. The request processing unit is configured to determine that the response comprises the information specifying the physical address from the destination data record when the source of the request is listed in the list of authorized entities.

BRIEF DESCRIPTION OF THE DRAWINGS

FIG. 3 is a block diagram of an example of a package shipper in accordance with an aspect of the disclosure;

FIG. 4 is a block diagram of an example of a delivery service entity in accordance with an aspect of the disclosure;

FIG. 12 is a block diagram of an example of a scheduling agent in accordance with an aspect of the disclosure; and FIG. 13 is a block diagram of a second example of a package shipper in accordance with an aspect of the disclosure.

DETAILED DESCRIPTION

The aspects of the present disclosure provide a secure means for the delivery of a package to a registered recipient. In accordance with an aspect of the disclosure, a recipient can hide its real physical address from a package source or package shipper by allowing the package source access to a limited sub-set of data that can be updated in real time. The package shipper obtains only certain information that the recipient deems "public". A package label with a code is created using this public information and brought to an authorized delivery service entity. The authorized delivery service entity can gain access to the secure physical address and re-label the package for shipment to the registered recipient if specifically allowed by the registered recipient. The authorized delivery service entity is preregistered with the system.

Figure 1:
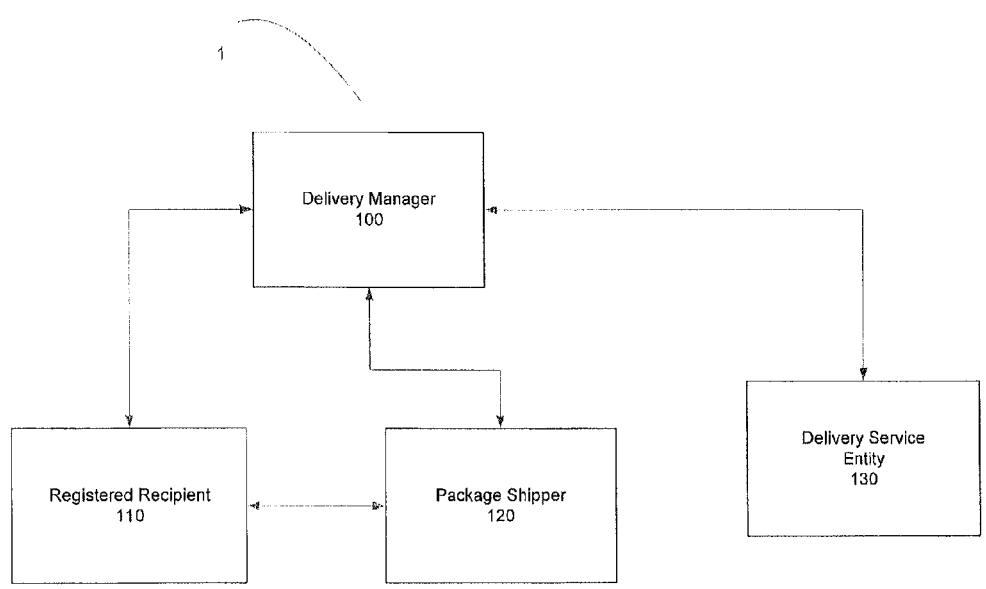
FIG. 1 is a block diagram of an example of a package delivery system in accordance with an aspect of the disclosure.

FIG. 1 is a block diagram of an example of package delivery system 1 in accordance with an aspect of the disclosure. The package delivery system 1 is controlled using a Delivery Manager 100. The Delivery Manager 100 receives and processes all requests for information related to registered recipients (Registered Recipients 110) from Package Shippers 120 and Delivery Service Entities 130. The Delivery Manager 100 can be centralized in one location. Alternatively, the Delivery Manager 100 can be distributed and divided into regions. Delivery Service Entity 130 can be the United States Post Office, Federal Express, UPS, private messaging services, intra-corporate mail services, colleges, campuses, etc.

A. Package Shipper 120 can be any entity who ships a package to a recipient including any commercial business and e-commerce vendor. If the recipient is a military personal, a Delivery Service Entity can be the Package Shipper 120 and the military post office would be the Delivery Service Entity 130 for purpose of delivery the package to the Registered Recipients 110 in accordance with an aspect of the disclosure.

Figure 2:
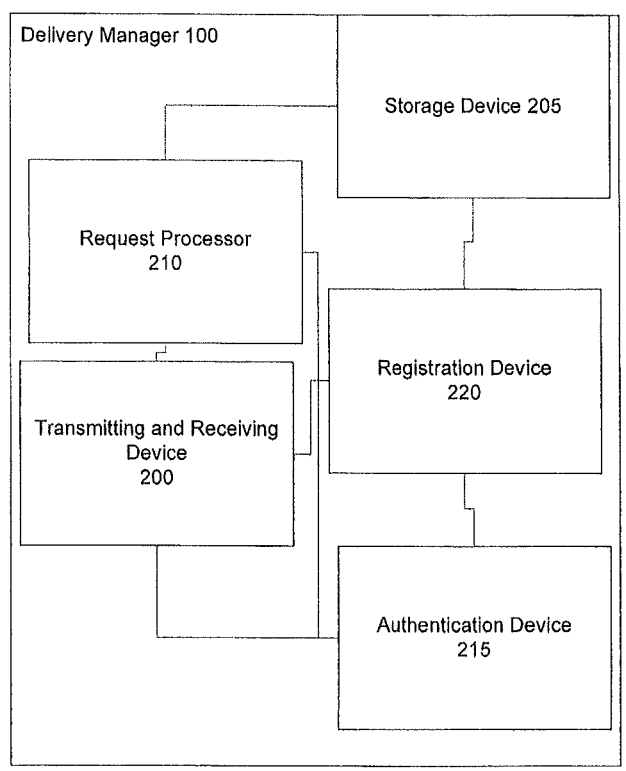
FIG. 2 is a block diagram of an example of a delivery manager in accordance with an aspect of the disclosure.

FIG. 2 is a block diagram of an example of a Delivery Manager 100 in accordance with an aspect of the disclosure. The Delivery Manager 100 comprises a Transmitting and Receiving Device 200, a Storage Device 205, a Request Processor 210, an Authentication Device 215 and a Registration Device 220.

The Storage Device 205 can be any known storage device such as, but not limited to, magnetic, optical, electronic, electromagnetic, infrared, or semiconductor system, apparatus, or device, or any suitable combination of the foregoing. The Storage Device 205 is configured to store a data record for each Registered Recipient 110. In an aspect of the disclosure, the data record comprises a user identifier, a password for access to the data record, a physical address for the recipient, a list of authorized delivery service entities. Optionally, the data record can also include special delivery instructions such as a temporary address, time of day delivery is allowed, and no signature required, etc. In accordance with another aspect of this disclosure, the data record can comprise additional security limitations or parameters that control access to certain levels of information. For example, the Registered Recipient 110 can define certain levels of information in the data record as public. Public information can be accessed by any entity. Semi-public information can be access by a registered Package Shipper 120. The Semi-public information will comprise the public information and other information that is deem semi-public by the Registered Recipient 120. Private information can be accessed only by a registered Delivery Service Entity 130. The private information can include the public information and semi-public information.

The Registered Recipient 110 can dynamically update the information in the data record. The data record is indexed by a record identifier. The record identifier can be an example of the public information.

Additionally, the Storage Device 205 is configured to store a data record for each Delivery Service Entity 130. The data record for the Delivery Service Entity 130 comprises a user name and password for the service and access credentials for each code reader, e.g., scanner, used by the Delivery Service Entity 130.

In another aspect of the disclosure, a Package Shipper 120 can also pre-register with the system 1. In accordance with this aspect, the Storage Device 205 is further configured to store a data record for each pre-registered Package Shipper 120.

Additionally, the Storage Device 205 can also include a program of instructions for causing the Transmitting and Receiving device 200, Request Processor 210, Authentication Device 215 and Registration Device 220 to execute the functionality described herein. Alternatively, the Delivery Manager 100 can have a separate storage for storing the program.

In an aspect of the disclosure, the Delivery Manager 100 is accessed remotely by the Registered Recipient 110, the Package Shippers 120 and Delivery Service Entities 130 via the Internet. For example, the Delivery Manager 100 can be accessed with a browser via a URL. Alternatively, the Delivery Manager 100 can be accessed by a code reader when a package label having a URL encoded therein is scanned. The Transmitting and Receiving Device 200 is configured to transmit and receiving data through the Internet.

The Request Processor 210 is coupled to the Transmitting and Receiving Device 200 and the Storage Device 205 and the Authentication Device 215. When data is received, the Request Processor 210 determines if the data is a request for information or a registration/record update. If the data is a request, the requester is authenticated via the Authentication Device 215 using information in the Storage Device 205. If the data is related to registration/record update, the data is sent to the Registration Device 220 for processing and the Authentication Device 215 for authentication prior to providing access to the data record.

The Registration Device 220 allows a person to create and store a data record in the Storage Device 205. The Registration Device 220 can include a graphical user interface with either a form finable application or drop down menus. In an aspect of the disclosure, the Registration Device 220 causes an interface to be displayed on a terminal device associated with the requester/user. For example, when a person enters a URL for the Delivery Manager 100, a homepage associated with the Delivery Manager 100 is displayed by the Authentication Device 215 via the Transmitting and Receiving Device 200. In an aspect of the disclosure, the homepage comprises multiple login sections: Registered Users/Recipients, Merchant/Package Shippers and Delivery Service Entities. If a valid login name and password is entered (determined by the Authentication Device 215), a secondary screen can be displayed. In an aspect of the disclosure, a secondary screen provides choices to add/update a data record or request for recipient data. If a selection of the "add/update a data record" is made, the Registration Device 220 displays an interface to update or add a data record. If the request is for data, the request is forwarded by the Transmitting and Receiving Device 200 to the Requester Processor 210.

FIG. 3 is a block diagram of an example Package Shipper 120 in accordance with an aspect of the disclosure. The Package Shipper 120 comprises a user terminal containing a Code Generator 300, a User Interface 310, a Request/Response Device 320 and a Labeling Device. 325.

The user terminal can be a PC, PDA, smartphone, optical reader, etc. The User interface 310 comprises a display for displaying an interface to the Delivery Manager 100 and an input device such as a keyboard or mouse. Alternately, the display can be a touch screen or touch panel and serve as both a display and the input device. In an aspect of the disclosure, the User Interface 310 is used to register the Package Shipper 120 with the Delivery Manager 100. The User Interface 310 can also be used to initiate a request. The request is sent via the Request/Response Device 320. If the Package Shipper

120 is registered, the terminal can also comprise a storage device which stores the user name and password.

The Request/Response Device 320 is configured to forward a request for recipient data and receive the response from the Delivery Manager 100. The Request/Response Device 320 according to aspects of the disclosure is capable of Internet communication. When the response is received, it is forwarded to the Code Generator 300. The Code Generator 300 generates a code using the information received and adds the URL for the Delivery Manager 100. The Code Generator 300 can be a QR code generator. The Labeling Device 325 prints a label of the code, e.g., QR code and the label is placed on the package. The Labeling Device 325 can be a printer. In an aspect of the disclosure, the label also comprises a written description of the public address, e.g., identifier.

FIG. 4 is a block diagram of an example of a Delivery Service Entity 130 in accordance with an aspect of the disclosure. The Delivery Service Entity 130 comprises a Code Generator 400, a Code Reader 405, a Request/Response Device 410, a Storage Device 415, a User Interface 420 and a Labeling Device 425. The Code Reader 405 is a scanner such as a bar code or QR code reader. In an aspect of the disclosure, the Code Reader 405, Code Generator 400, Request/Response Device 410 and Storage Device 415 are in a handheld scanner. The Delivery Service Entity 130 will have a plurality of scanners. Each scanner will contain in its Storage Device 415 credentials which allow access to data records in the Delivery Manager 100. The Delivery Service Entity 130 registers the scanners with the Delivery Manager 100 using the User Interface 420 and a Network Access Device 430. The Delivery Manager 100 assigns the credentials. Once assigned, the credentials are stored in the Storage Device 415 of each scanner. In an aspect of the disclosure, each scanner owned by the Delivery Service Entity 130 can have the same credentials. In another aspect of the disclosure, each scanner will have a different security credential and identifier. The security credentials can be wirelessly transmitted to each scanner (not shown).

FIG. 4 depicts one User Interface 420; however, in an aspect of the disclosure, each delivery location can have its own User Interface 420 and register its own scanners with the Delivery Manager 100, e.g., each post office. The User Interface 420 is similar to User Interface 310 and will not be described again in detail. The Code Generator 400, Request/Response Device 410 and Labeling Device 425 can be the same as described above, and therefore will not be described again.

Figures 5, 6:
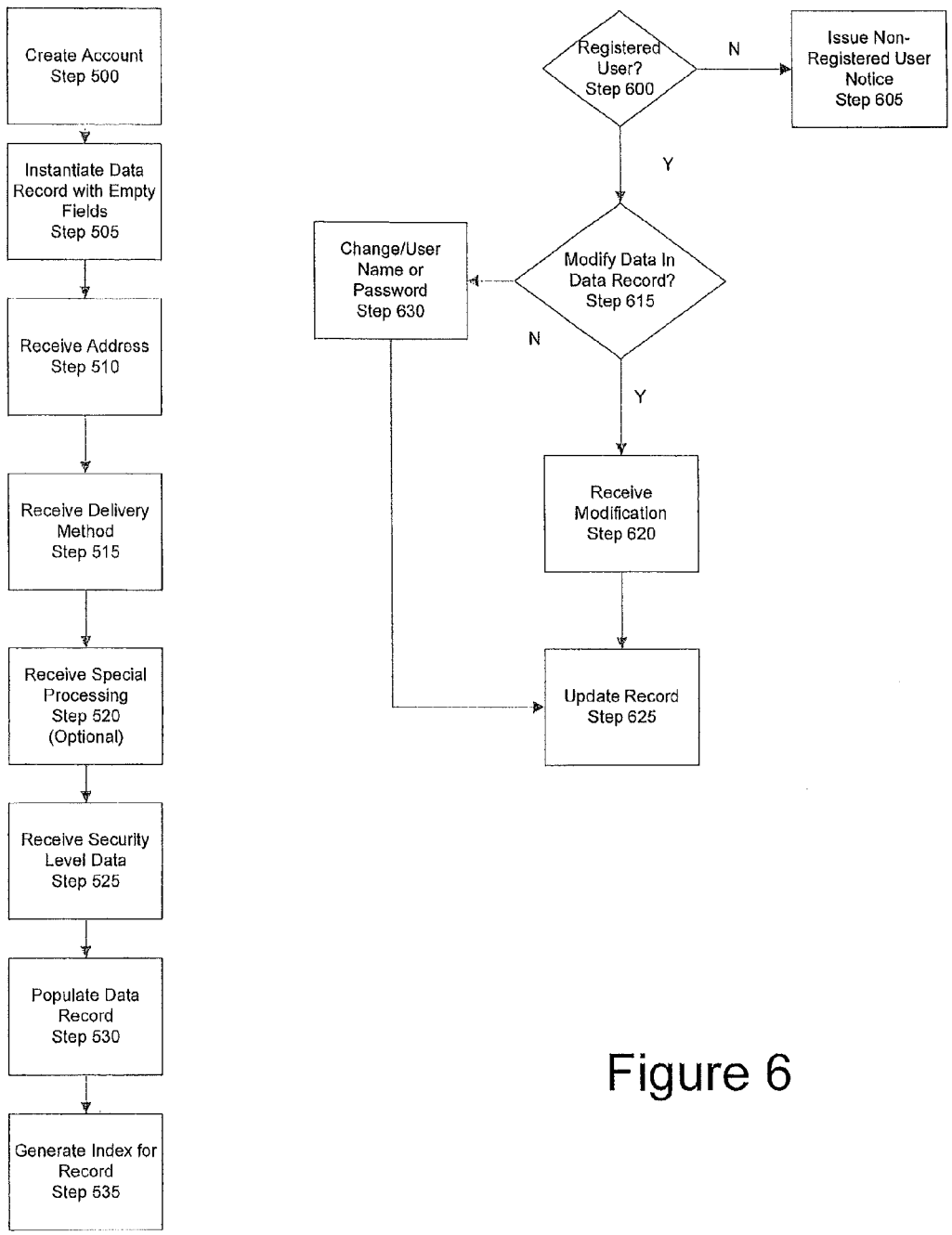
FIG. 5 is a flow chart of an example of a recipient registration method in accordance with an aspect of the disclosure.
FIG. 6 is a flow chart of an example of a data maintenance method in accordance with an aspect of the disclosure.

FIG. 5 is a flow chart of an example of a recipient registration method in accordance with an aspect of the disclosure. The recipient registers with the system 1 via the Internet using the URL of the Delivery Manager 100. In an aspect of the disclosure, the Delivery Manager 100 is an OpenID compliant data service.

At step 500, an account is created. The Delivery Manager 100 prompts a user to enter a user name and password. In an aspect of the disclosure, the homepage contains an icon or section for new users. Once a user depresses, e.g., clicks on the link, a secondary page is displayed by the Registration Device 220. For example, a registration interface is displayed. The registration interface may include a form tillable interface for a user name and password. The Delivery Manager 100 confirms the user name and password and instantiates a data record with Empty fields and associates the new data record with the user name and password at step 505.

In an aspect of the disclosure, another registration interface is displayed for the user to enter personal information such as physical address(es) (step 510), list of preferred delivery services (step 515), special receiving options (step 520) and security levels (step 525). The preferred delivery services can be individually entered or selected from a list. Alternatively, delivery options can be added by inputting the URL associated with the organization.

As described above, the security levels are used to determine which entities can have access to certain data from the data record. For each item of data entered into the data record, the user can select a security level. In an aspect of the disclosure, the user name is automatically given a public security level, e.g., the user name can be accessed by all requesters. After all of the data is entered, the data is populated by the Registration Device 220 into the data record at step 530.

The Registration Device 220 generates an index for the data record at step 535. The index can be the user name.

In another aspect of the disclosure, the user can login to the data record via biometric devices. Additionally, a recipient can have different levels of editing permission based upon the authentication method. For example, access via the biometric device can have the highest editing permission. Thus, when an account is created, biometric information such as a fingerprint template or eye pattern is stored as the authenticating data.

Once the data record is created, the data record can be dynamically updated. For example, a recipient can update the physical address, even during shipment. The recipient can add contingencies and secondary addresses if no one is home at the primary address.

FIG. 6 is a flow chart of an example of a data maintenance method in accordance with an aspect of the disclosure. The Registered Recipient 110 accesses the Delivery Manager 100 via the Internet using the URL. The homepage is displayed on the user terminal. The Registered Recipient 110 enters the user name and password in the Registered Recipient section of the homepage. At step 600, the Authentication Device 215 determines if user name and password are valid. Alternatively, the Registered Recipient 110 inputs authentication data via a biometric device. If the authentication data is not correct ("N" at step 600), the Authentication Device 215 issues a non-registered notice at step 605. The non-registered notice can be an audible sound or an error window.

If the authentication data is valid ("Y" at step 600), the Registered Recipient 110 is given access to the data record. In an aspect of the disclosure, the Authentication Device 215 issues a signal to the Registration Device 220 with the valid user name and password. The Registration Device 220 causes a secondary webpage containing the data in the data record to be displayed on a Registered Recipient's terminal. The Registered Recipient 110 can modify any and all of the data from the data record and the user name and password. At step 615, the Registration Device 220 determines if the Registered Recipient 110 wants to modify the data in the data record or the user name and password. For example, if the Registered Recipient 110 selects a specific field for modification ("Y" at step 615), the Registration Device 220 can cause a secondary modification webpage to be displayed. The modified data is received as step 620. The Registration Device 220 updates the data record at step 625. The Registration Device 220 stores the updated data in the associated data record in the Storage Device 205.

If the Registered Recipient 110 selects the user name and password to change ("N" at step 615), the Registration Device 220 can cause a secondary webpage to be displayed to input a changed user name and password. At step 630, the updated user name and password is received. If the user name is used as the record index, the record index is also updated, at step 625.

As described above, access to the data can be limited: public, semi-public and private. In an aspect of the disclosure, only registered delivery service entities, can have access to the private data.

Figure 7:
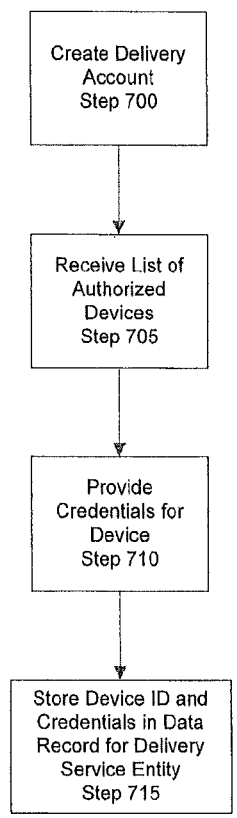
FIG. 7 is a flow chart of an example of a delivery service entity registration method in accordance with an aspect of the disclosure.

FIG. 7 is a flow chart of an example of a delivery service entity registration method in accordance with an aspect of the disclosure. An unregistered delivery service entity registers with the system 1 via the Internet using the URL of the Delivery Manager 100. The homepage is displayed on the user terminal. The homepage contains a section for delivery service entities. The section includes a link or button for user selection. An unregistered delivery service entity can create an account using a secondary webpage displayed in its terminal, e.g., User Interface 420. The Registration Device 220 displays the secondary webpage. The registration interface may comprise a form fellable interface for a user name and password for the Delivery Service Entity 130. The Delivery Manager 100 confirms the user name and password and instantiates a data record with empty fields and associates the new data record with the user name and password, at step 700.

In an aspect of the disclosure, another registration interface is displayed for the Delivery Service Entity 130 to enter data for the data record. At step 705, a list of authorized code readers 405 (scanner) is entered. Each scanner is provided credential at step 710. In an aspect of the disclosure, the credentials can comprise an encryption key. In another aspect of the disclosure, the credentials comprise an authentication code transmitted from the Code Reader 405 upon scanning the code. The authentication code is used to authenticate the Code Reader 405 to the registered Delivery Service Entity 130 and ultimately to the data in the Registered Recipients data record. The physical address will only be sent to a Delivery Service Entity 130 (registered), if the Code Reader 405 is authenticated at the time of the request and if the recipient has given specific permission to the Delivery Service Entity 130 to access the physical address.

Similarly, a Package Shipper 120, such as a merchant can registered with the system 1 via the Delivery Manager 100. An unregistered package shipper, e.g., merchant, can registered with the system 1 via the Internet using the URL of the Delivery Manager 100. The homepage is displayed on the user terminal. The homepage can include a section for new package shippers, e.g., merchants. The merchant will create an account having a user name and a password. The user name and password is subsequently used to authenticate a request for data from a recipient data record, e.g., access to semi-public data. The semi-public data can be provided to any registered user.

Figure 8:
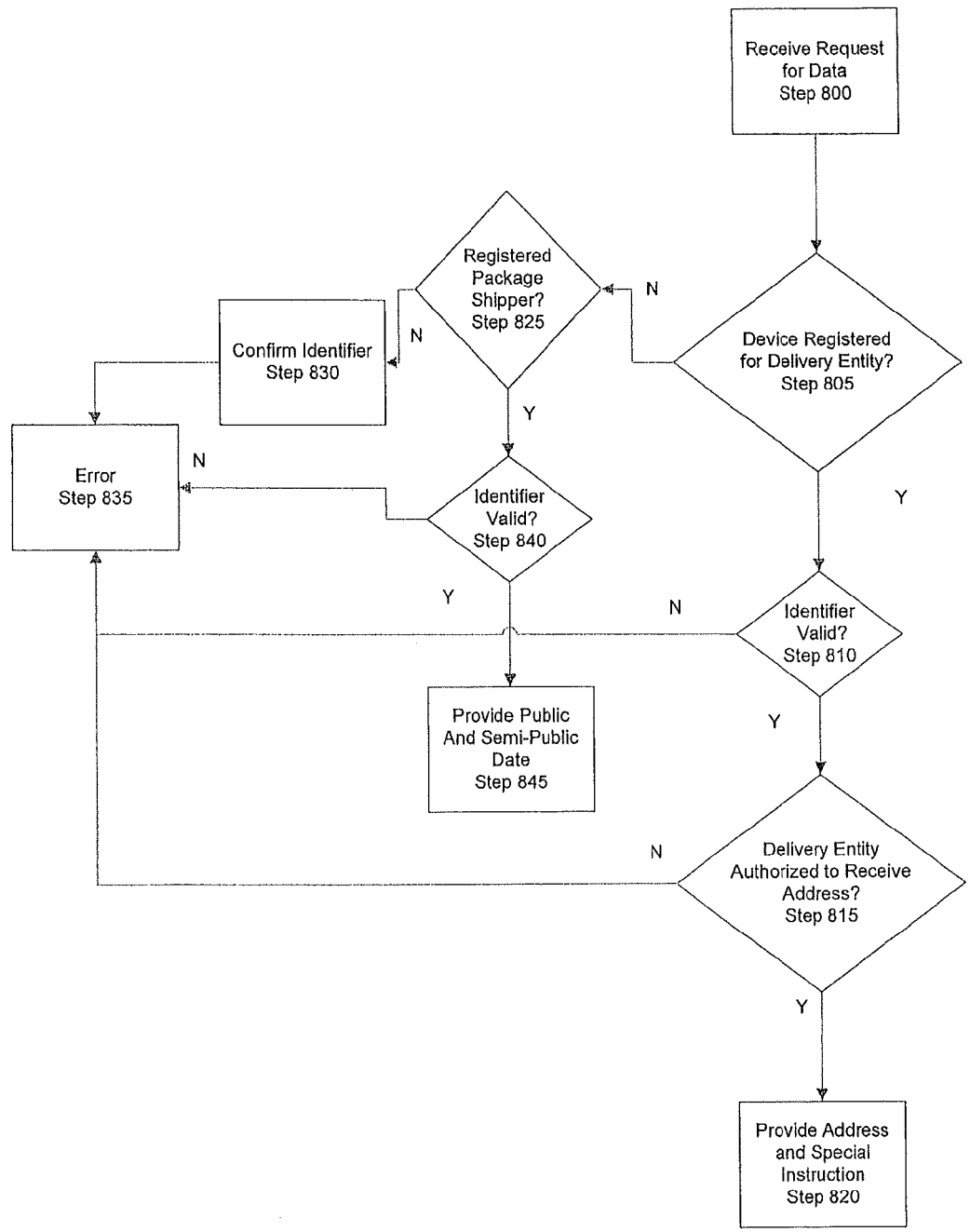
FIG. 8 is a flow chart of an example of a request processing method in accordance with an aspect of the disclosure.

FIG. 8 is a flow chart of an example of a request processing method in accordance with an aspect of the disclosure. At step 800, the Delivery Manager 100 receives a request for information. In an aspect of the disclosure, the request is received by the Transmitting and Receiving Device 200. The request can be received via manual input from the requester of the record index or a transaction identifier. Alternatively, the request can be received from a Code Reader 405 scanning a code. Prior to any disclosure of data, the request is processed by the Authentication Device 215 at step 805. The Authentication Device 215 determines the type of requester, i.e., Package Shipper 120 or Delivery Service Entity 130. In an aspect of the disclosure, the Authentication Device 215 matches the authentication information, if any (either manually entered into the website or automatically received from the Code Reader 405), with authentication information in the data records. If the authentication information matches a Delivery Service Entity 130 ("Y" at step 805), the Request Processor 210 retrieves a data record from the Storage Device 205 matching the identifier included in the request. The identifier can be a data record index. The identifier can be a user name of the recipient. If there is no data record ("N" at step 810), an error message is generated at step 835. If there is a data record, the Request Processor 210 searches the list of authorized delivery service entities in the data record for the name of the particular delivery service that is associated with the Code Reader 405 at step 815.

The Request Processor 210 then confirms if the Coder Reader 405 is an authorized reader associated with the Delivery Service Entity 130 using the stored delivery service entity data records. If the Coder Reader 405 is authorized and if the Delivery Service Entity is also authorized ("Y" at step 815), the physical address is provided to the Delivery Service Entity 130 along with other private information at step 820. The order of examining the data records can be reversed where the data records of the delivery service entities can be examined first followed by examining the data record that corresponds with the code and the transaction identifier or any other identifier used for matching. The private information can include special delivery instructions.

If the delivery service entity is not authorized ("N" at step 815), the request for data is denied and an error message is generated at step 835. In an aspect of the disclosure, the error message can comprise a specific indication that the requestor is not authorized to access the private data. A notification can also be issued to the Registered Recipient 110.

If at step 805, the request was not received from a Code Reader 405 ("N" at step 805), in an aspect of the disclosure, the Authentication Device 215 can determine if the request was from an authorized Package Shipper 110 (at step 825). The Authentication Device 215 compares the login information, user name and password with the same in the data records for shippers at step 830. If there is no match ("N" at step 825), only the public information is provided, e.g., confirm a recipient exists at step 830. For example, the Request Processor 210 retrieves a data record corresponding to the identifier in the request. If a record exists, the Request Processor 210 causes the Transmitting and Receiving Device 200 to confirm that validity of the identifier at step 830. No other information is provided. Additionally, a notification is issued indicating that the user name and password provided is incorrect, e.g., step 835, A notification can also be issued to the Registered Recipient 110.

If the user name and password provided match a Registered Shipper 120 ("Y" at step 830), the public data and the semi-public data can be provided. For example, the Request Processor 210 retrieves a data record corresponding to the identifier in the request. If a record exists ("Y at step 840), the Request Processor 210 causes the Transmitting and Receiving Device 200 to confirm that validity of the identifier at step 845 and transmit the semi-public data including a list of authorized Delivery Service Entities 130. If the data record does not exist ("N" at step 840), an error message is generated at step 835.

Figure 9:
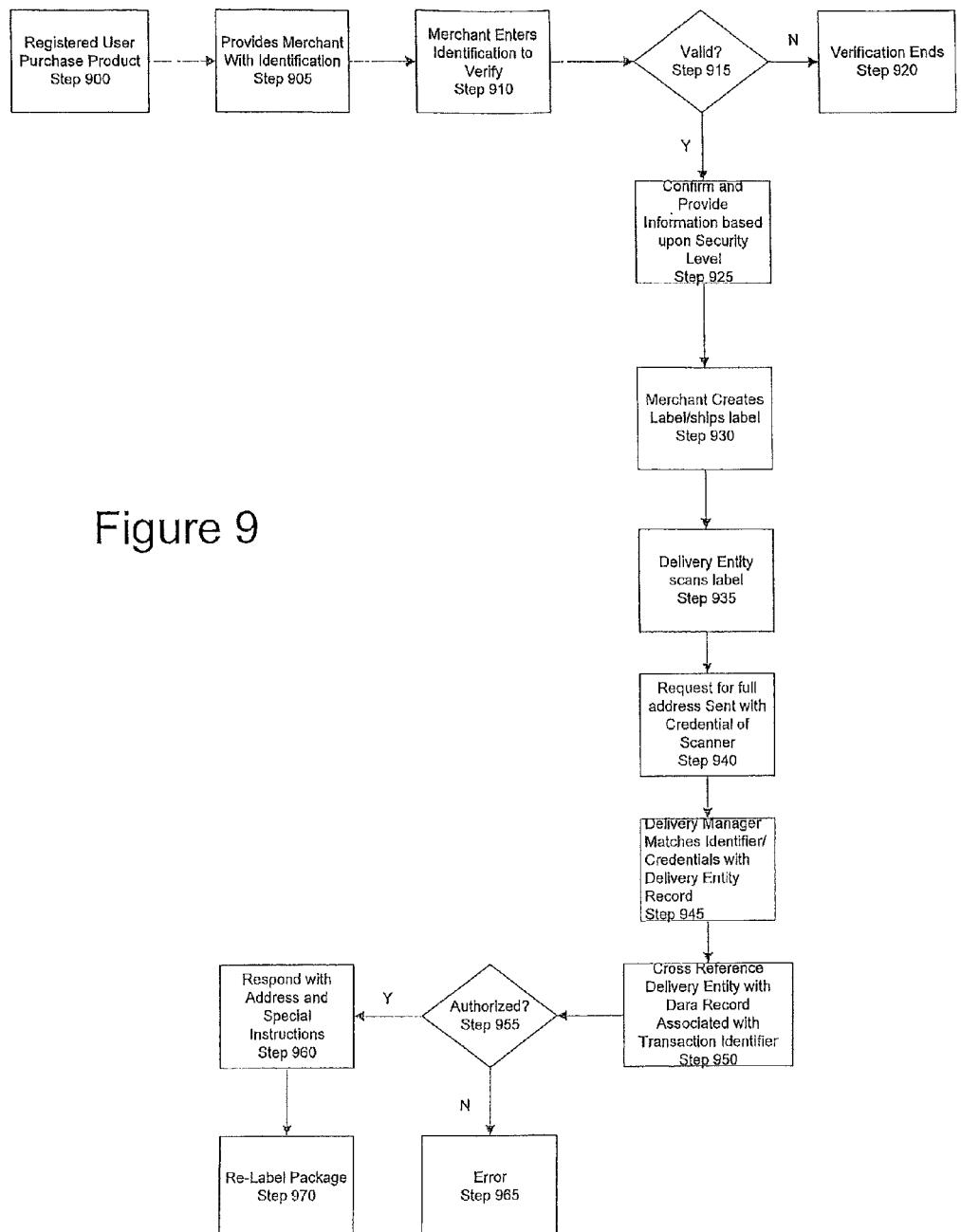
FIG. 9 is a flow chart of an example of an e-commerce transaction and delivery in accordance with an aspect of the disclosure.

FIG. 9 is a flow chart of an example of an e-commerce transaction in accordance with an aspect of the disclosure. At step 900, a Registered Recipient 110 purchases a product online. The purchaser is then prompted to enter an identifier associated with the data record stored in the Delivery Manager 100. The identifier can be the index for the data record. Additionally, the identifier can be an email address. At step 905, the identifier is entered by the purchaser. The merchant then attempts to verify the identifier and the existence of a data record by entering the merchant's user name and password (if registered) into a homepage of the Delivery Manager 100 at step 910 and the identifier received from the purchaser. If the merchant is not registered, the merchant will only enter the identifier.

The Authentication Device 215 compares the login information, user name and password with the same in the data records for shippers at step 915. If there is no match for the identifier ("N" at step 915), the verification ends at step 920. The merchant can notify the purchaser that the identifier is invalid. If the user name and password is incorrect, only the public information is provided, e.g., confirm the existence of a data record associated with the identifier. The Delivery Manager 100 can send the Registered Recipient a notification of an unauthorized attempt to access the data record (not shown in the figure). If there is a match ("Y" at step 915), the Request Processor 210 retrieves the data record corresponding to the identifier and confirms the existence of an identifier and returns the appropriate information depending on the security level in the data record, at step 925.

In an aspect of the disclosure, the Delivery Manager 100 can notify the purchaser that the merchant has requested data from its data record. Prior to confirmation of the identifier and transmission of any data from the record, the purchaser can authorize the Delivery Manager 100 to provide the requested information to the specific merchant (not shown in the figure). The purchaser does this by entering a user name and password. The Delivery Manager 100 prompts the purchaser to confirm authorization. If authorization is provided, the Delivery Manager 100 transmits the confirmation of the identifier along with a transaction code and the semi-public information to the merchant. The transaction code includes a transaction identifier and a timestamp. The semi-public information includes a list of delivery services allowed by the purchaser. This ensures that the merchant can selected from only the Delivery Service Entities 130 that the purchaser permitted delivery. Additionally, a confirmation of the identifier assures that the purchaser has a valid physical address for delivery. The transaction identifier is a unique identifier for the specific transaction. In another aspect of the disclosure, the transaction identifier can be specific to the purchaser such as the record index which is permanently associated with the purchaser. The transaction identifier is temporarily stored in the purchaser's data record.

In another aspect of the disclosure, the purchaser (as a registered recipient) enters its user name and password at the time of purchase, and the Delivery Manager 100 verifies the login information with the associated data record. Once verified, the Delivery Manager 100 transmits a code to the purchaser. The code can be a QR code. Using a code reader on the purchaser's terminal, such as a smartphone, the purchaser scans the QR code. The QR code can then be send to the merchant. The merchant scans the code to generate the request.

At step 930, the merchant creates a mailing label. The mailing label comprises a return address, the transaction identifier and a destination code, e.g., a QR code. The destination code includes the URL for the delivery manager, the transaction identifier which is used to look up the associated physical address. Optionally, the code can include merchant specific information such as an invoice number, value of the purchase and merchant name. Additionally, postage specific fields can also be included in the QR code, such as type of contents, special handling instructions, e.g., fragile. Further, the QR code can include the postage amount. When the code is scanned, the scanning will invoke a web service call using the URL. The merchant can scan the code to confirm the encoding process. If the coding is correct, the merchant should be directed to the Delivery Manager and semi-public information should be provided.

The package is sent to the Delivery Service Entity 130. Alternatively, the Delivery Service Entity 130 picks up the package at the merchant's location. The Delivery Service Entity 130 scans the code at step 935. The scanning causes the Delivery Service Entity 130 to interface with the Delivery Manager 100 via the web service call. The scanning device authenticates itself using the pre-stored credentials at step 940. The request includes the transaction identifier from the QR code. At step 945, the authentication information is compared with login information from data records associated with delivery service entities. If there is a match, the Request Processor 210 retrieves a data record from the Storage Device 205 matching the transaction identifier or code included in the request and the data record associated with the Delivery Service Entity 130. At step 950, the Request Processor 210 cross-references the two data records to confirm that the Delivery Service Entity 130 is authorized to access the physical address of the purchaser. The purchaser's data record is located using the transaction identifier. If the requester, e.g., delivery service entity, is not authorized ("N" at step 955), an error message is transmitted from the Delivery Manager 100 and the address is not provided at step 965. The item can be returned to the merchant. Additionally, the merchant can be notified of the invalid request. Furthermore, the purchaser is notified of an unauthorized attempt to access to the data record. If access is authorized ("Y" at step 955), the Delivery Service Entity 130 (scanner) receives the private information including the physical address and other data from the data record that the purchaser can chosen to shared with the Delivery Service Entity 130, e.g., special delivery instructions at step 960. At step 970, the Delivery Service Entity 130 creates a new mailing label for the package using the physical address. Alternatively, the Delivery Service Entity 130 can route the package internally within the service network, without a new address label and at each routing point, the delivery agent at the point, scans the package in order to decide how to further route the package. For example, each post office can scan the package to determine how to dynamically route the package through the postal system.

Figure 10:
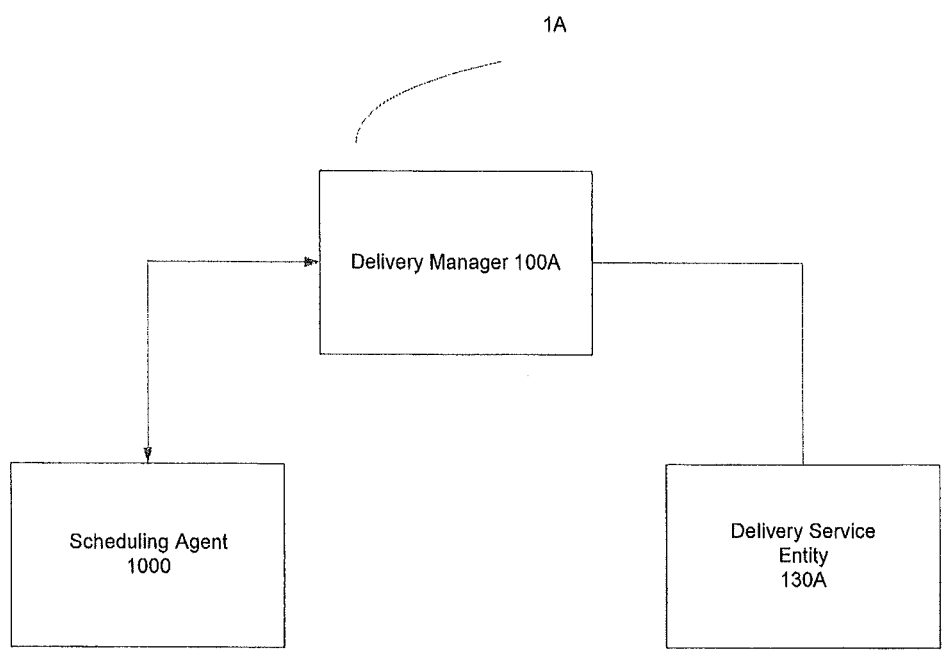
FIG. 10 is a block diagram of a second example of a package delivery system in accordance with aspect of the disclosure.

FIG. 10 illustrates a block diagram of a second example of a package delivery system 1A in accordance with an aspect of the disclosure. The package delivery system 1A is controlled using a Delivery Manager 100A. The Delivery Manager 100A receives and processes all requests for information related to a package for Delivery Service Entity 130A. Additionally, the Delivery Manager 100A receives real time package delivery information related to the package from the Scheduling Agent 1000. The Delivery Manager 100A can be centralized in one location. Alternatively, the Delivery Manager 100A can be distributed throughout and divided into regions. Delivery Service Entity 130A can be the United States Post Office, Federal Express, UPS, private messaging services, intra-corporate mail services, colleges, campuses, etc.

In accordance with an aspect of the invention, a package is assigned an identifier by the Scheduling Agent 1000. Alternatively, the Delivery Manager 100A assigns the identifier. The package comprises a container and internal contents. The identifier is used to create a delivery record for the package. The delivery record is stored in the Delivery Manager 100A. The delivery record can include delivery information for the package. In an aspect of the disclosure, the delivery information can comprise a sequence list of shipment addresses defining a shipment order for the package. The sequence can be dynamically updated. The updates can include adding a recipient, deleting a recipient, and re-ordering the sequence. The updating can occur after the package is shipped. The Scheduling Agent 1000 creates the order and can update the order via the Delivery Manager 100A. The package is shipped with a code and an address label on the container. In an aspect of the disclosure, the code is included in the address label. Alternatively, the code and the address label can be separate. The code is configured to be scanned by the Delivery Service Entity 130A. When the code is scanned, the scanning will invoke a web service call to the Delivery Manager 100A via an embedded URL.

Figure 11:
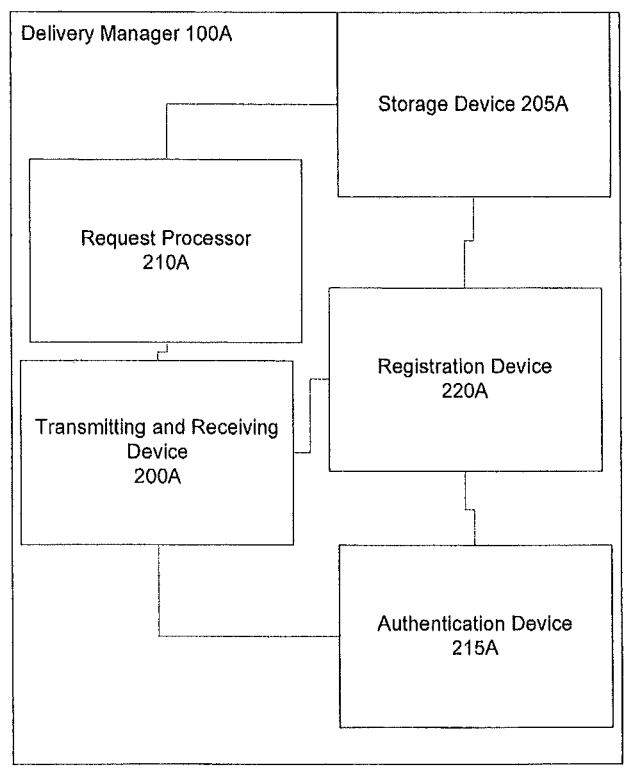
FIG. 11 is a block diagram of a second example of a delivery manager in accordance with an aspect of the disclosure.

FIG. 11 illustrates a block diagram of the Delivery Manager 100A. The components of the Delivery Manager 100A are similar to the device depicted in FIG. 2, but certain functionalities are different. The similarities will not be described in detail again.

The Storage Device 205A is configured to store package records and registered Scheduling Agents 1000. The Request Processor 210A is configured to process requests from the Delivery Service Entity 130A for the delivery addresses for the package. The Request Processor 210A tracks the number of requests received for the same package and provides the requester with the address corresponding to the next recipient. In an aspect of the disclosure, each time the request processor 210A receives a request for the same package, the request processor 210A cause a flag to be added to the package record indicating that the recipient's information has/is being transmitted.

The Transmitting and Receiving Device 200A is configured to receive scheduling information from the Scheduling Agent 1000 and forward the information to the Registration Device 220A. The package record can also be transmitted to the Scheduling Agent 1000 through the Transmitting and Receiving Device 200A. The Transmitting and Receiving Device 200A is also configured to receive requests for an address from the Delivery Service Entity 130A and transmit a response.

The Registration Device 220A allows the Scheduling Agent 1000 to register with the Delivery Manager 100A and schedule a recipient order for a specific package and store the information into the Storage Device 205A. The Registration Device 220A is coupled to the Storage Device 205A and records the data received from the Scheduling Agent 1000 in either the package record or an agent record.

In order to update an existing package record, a Scheduling Agent 1000 must be preregistered. The Authentication Device 215A is configured to authenticate the Scheduling Agent 1000. The registration process is similarly to the registration process described above and therefore will not be described again in detail. In an aspect of the disclosure, a scheduling agent record comprises a user name and password. The Authentication Device 215A uses a user name and password in the scheduling agent record to authenticate. The authentication data can also be biometric information such as a fingerprint template and eye pattern. The biometric information is stored in the Storage Device 205A. In an aspect of the disclosure, the Scheduling Agent 1000 can be the originating package shipper. Once a scheduling agent record is created, the Scheduling Agent 1000 can create a package record.

FIG. 12 is a block diagram of an example of a Scheduling Agent 1000 in accordance with an aspect of the disclosure. The Scheduling Agent 1000 comprises a user terminal containing a Code Generator 1200, a Labeling Device 1205, a User Interface 1210 and a Transmitting and Receiving Device 1215.

The user terminal can be a PC, PDA, smartphone, etc. The User Interface 1210 may comprise a display for displaying an interface to the Delivery Manager 100A and an input device. In an aspect of the disclosure, the User Interface 1210 is used to register the Scheduling Agent 100 with the Delivery Manager 100A and to create package records and scheduling orders. The data is transmitted to and from the Scheduling Agent 1000 via the Transmission and Reception Device 1215. The Transmission and Reception Device 1215 can be any known device that is configured to transmit and receive data. The Code Generator 1200 and Labeling Devices 1205 are similar to the devices described above and thus will not be described again in detail. The Code Generator 1200 generates a code to be placed on the package container; the Labeling Device 1205 creates the label. The code comprises the URL for the Delivery Manager 100A and the package identifier. In an aspect of the disclosure, the code can comprise an initial delivery address. A mailing label having the initial delivery address is also generated and placed on the container of the package.

A package record is created in a similar manner as described in FIG. 5. First, a package record is instantiated with empty fields for one or more addresses. The Scheduling Agent 1000 inputs the addresses in delivery order. Once all of the addresses are input, the Registration Device 220A populates the package record and generates an index for the record. The index can be used as the package identifier placed on the container. The index is transmitted to the Scheduling Agent 1000. The index can be used by the Code Generator 1200 to generate the package code.

A scheduling agent record and package record can be modified in a same manner as described above with respect to FIG. 6.

FIG. 13 is a block diagram of an example of a Delivery Service Entity 130A in accordance with an aspect of the disclosure. The Delivery Service Entity 130A comprises Code Generator 400A, Code Reader 405A, Request/Response Device 410A and Labeling Device 425A. The Code Reader 405A is a scanner such as a bar code or QR code reader. In an aspect of the disclosure, the Code Reader 405A, Code Generator 400A, Request/Response Device 410A and Labeling Device 425A are in a handheld scanner.

When a package is received by the Delivery Service Entity 130A, the code is read by the Code Reader 405A. This invokes a web service call to the Delivery Manager 100A via the URL embedded in the code by the Request/Response Device 410A. The request for the current address is received by the Transmitting and Receiving Device 200A and forwarded to the Request Processor 210A. The request comprises the package identifier. In an aspect of the disclosure, the request also comprises the last delivered address. The Requester Processor 210A retrieves the package record from the Storage Device 205A and looks up the next recipient in the scheduled order. The Requester Processor 210A forwards the next recipient address to the Transmitting and Receiving Device 200A for transmission to the Delivery Service Entity 130A.

The address is received by the Delivery Service Entity 130A and forwarded to the Code Generator 400A by the Request/Response Device 410A. The Code Generator 400A creates a code comprising the URL for the Delivery Manager 100A and the current address. The Labeling Device 425A creates a mailing label for the package comprising the code and the current address. In an aspect of the disclosure, the Code Generator 400A can be removed from the Delivery Service Entity 130A. The Labeling Device 425 would create a mailing label with the current address. The label would be placed on the package without covering the original package code. Alternatively, the package shipper can be a separate entity from the Scheduling Agent 1000.

While the first and second examples of the package delivery system have been separately described, the systems can be combined and used together to create package delivery system with varied levels of security and access to information and have a scheduling of an shipment or delivery order.

Additionally, the Delivery Manager 100/100A can track a number of packages shipped to a specific physical address. The number of packages can be compared with a threshold number of packages contained in a data record. The Registered Recipient 110 or the Scheduling Agent 1000 can set the threshold during registration and update the threshold. Once the threshold is reached, the package can be delivered to a secondary address listed in the data record. Therefore, the Delivery Manager 100/100A may also be used as a load balancer.

As will be appreciated by one skilled in the art, aspects of the present disclosure may be embodied as a system, method or computer program product.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "Delivery Manager," "Device", "section", "module," "component," "network" or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terms "Delivery Manager," "Device", "section", "module," "component," "network" or "system" as may be used in the present disclosure may include a variety of combinations of fixed and/or portable computer hardware, software, peripherals, and storage devices. The system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving, from a merchant, a first request to verify an identifier associated with a purchaser;
   transmitting, to the merchant, a response to the first request, the response indicating an existence of a physical address associated with the identifier without including the physical address itself, the response further comprising a list of delivery entities that are authorized by the purchaser to access information specifying the physical address, wherein the existence of the physical address is designated as public information and the physical address itself is designated as private information by the purchaser to define varied levels of security and access thereto;
   receiving, from one of the delivery entities selected by the merchant, a second request to access information specifying the physical address associated with the identifier;
   determining that the one of the delivery entities is authorized by the purchaser to have access to the information specifying the physical address by analyzing the list of delivery entities; and
   providing the physical address to the one of the delivery entities responsive to determining that the one of the delivery entities is authorized.

2. The method according to claim 1, further comprising:
   populating, for the purchaser, a destination data record with the identifier, the physical address associated with the identifier, and the list of authorized entities authorized to access information specifying the physical address,
   wherein the destination data record is populated responsive to registration by the purchaser.

3. The method according to claim 2, further comprising:
   receiving a modification to the destination data record.

4. The method according to claim 3, wherein the modification comprises changing the physical address.

5. The method according to claim 3, wherein the modification comprises changing an authorized entity.

6. The method for delivering a package to the destination having the physical address according to claim 3, further comprising:
   notifying the purchaser responsive to receiving the first request; and
   receiving authorization from the purchaser prior to responding to the first request,
   wherein the receiving the modification occurs after the merchant ships the package.

7. The method according to claim 1, further comprising:
   requesting the one of the delivery entities for access credentials, the access credentials comprising a predefined user name and password.

8. The method according to claim 2, wherein the destination data record further comprises specific delivery instructions.

9. The method according to claim 1, wherein the identifier is permanently associated with a physical address.

10. The method according to claim 1, wherein the responding comprises:
    determining if the identifier is authentic; and
    generating the response, wherein the response further comprises a transaction identifier, a timestamp, and wherein the authorized entity is a permitted delivery entity.

11. The method for delivering a package to destination having the physical address according to claim 10, wherein the package comprises a code encoding a uniform resource locator (URL) for a processing server which processes the first and second requests, the code further encoding the transaction identifier.

12. The method according to claim 11, wherein the second request for information specifying the physical address associated with the identifier is received when the one of the delivery entities selected by the merchant scans the code and decodes the URL, and wherein the second request comprises the transaction identifier.

13. The method according to claim 11, wherein the code further encodes the identifier, postage, an invoice number and amount, content information and special handling instructions.

14. The method according to claim 12, wherein the code comprises a quick response (QR) code.

15. The method for delivering a package to a destination having the physical address according to claim 12, further comprising:
    registering a scanning device, wherein said scanning device is associated with the one of the delivery entities selected by the merchant, and wherein said determining that the one of the delivery entities selected by the merchant is authorized comprises:
    detecting if the second request is received from the registered scanning device; and
    confirming, in response to a determination that the second request is received from the registered scanning device, whether the registered scanning device is registered by analyzing the list of delivery entities corresponding to the identifier.

16. The method of claim 1, further comprising:
    associating the identifier with a container;
    creating a relationship between said identifier and a plurality of addresses corresponding to a plurality of recipients defining a sequential delivery order;

receiving a request for an address associated with the identifier;

selecting one of the plurality of addresses based upon the sequential delivery order; and providing the selected one of the plurality of addresses.

17. The method according to claim 16, wherein the method further comprises:

receiving a subsequent request for an address associated with the identifier;

selecting a subsequent one of the plurality of addresses based upon the sequential delivery order; and providing the subsequent selected one of the plurality of addresses.

18. The method according to claim 16, wherein the relationship between one of the plurality of addresses and the identifier is created after the package is delivered to one of the plurality of recipients.

19. The method according to claim 16, wherein a code on the container encodes the identifier.

20. The method according to claim 19, wherein the code is a quick response (QR) code.

21. The method according to claim 16, further comprising:

tracking a number of containers delivered to each recipient; and adjusting the sequential delivery order based upon the number of containers delivered to a respective recipient.

22. A computer program product comprising:

a non-transitory computer readable storage medium having computer readable program code embodied therewith, the computer readable program code comprising:

computer readable program code to provide a response to a first request from a merchant to verify an identifier associated with a purchaser, the response indicating an existence of a physical address associated with the identifier without including the physical address itself, the response further comprising a list of delivery entities that are authorized by the purchaser to access information specifying the physical address, wherein the existence of the physical address is designated as public information and the physical address itself is designated as private information by the purchaser to define varied levels of security and access thereto;

computer readable program code to receive, from one of the delivery entities selected by the merchant, a second request to access information specifying the physical address associated with the identifier;

computer readable program code to determine that the one of the delivery entities is authorized by the purchaser to have access to information specifying the physical address by analyzing the list of delivery entities; and computer readable program code to provide the physical address to the one of the delivery entities responsive to determining that the one of the delivery entities is authorized.

23. The computer program product of claim 22, further comprising:

computer readable program code to associate the identifier with a container;

computer readable program code to store in a storage device a relationship between said identifier and a plurality of addresses corresponding to a plurality of recipients defining a sequential delivery order;

computer readable program code to receive a request for an address associated with the identifier;

computer readable program code to select one of the plurality of addresses based upon the sequential delivery order; and computer readable program code to provide the selected one of the plurality of addresses.

24. An apparatus comprising:

a storage unit to store a plurality of destination data records, the plurality of destination data records being indexed by a respective identifier and including public information and private information designated by a respective purchaser and defining varied levels of security and access thereto;

a communications unit to receive a request for information about a purchaser and transmit a response to the request;

an authentication unit to identify a source of the request as a merchant or a delivery entity selected by the merchant; and a request processing unit to determine the response to the request based upon an identity of the source, the response being determined to comprise either:

the public information comprising a confirmation of an existence of a destination data record, along with a list of delivery entities that are authorized by the purchaser to access information specifying a physical address from the destination data record, where the request comprises an identifier of the destination data record and where the response does not include the physical address itself, or the private information specifying the physical address from the destination data record, wherein the request processing unit is to determine that the response comprises the public information when the source of the request is the merchant, and that the response comprises the private information specifying the physical address from the destination data record when the source of the request is listed in the list of delivery entities.

* * * * *